United States Patent [19]
Tabet

[11] 3,874,183
[45] Apr. 1, 1975

[54] COOLING DEVICE FOR FLUID OF A MOTOR VEHICLE TRANSMISSION

[75] Inventor: Michael A. Tabet, Norfolk, Va.

[73] Assignee: Hughes D. Burton, Norfolk, Va. ; a part interest

[22] Filed: Feb. 21, 1974

[21] Appl. No.: 444,679

[52] U.S. Cl. ............. 62/3, 74/606 A, 123/196 AB, 62/323, 62/239
[51] Int. Cl. .......................................... F25b 21/02
[58] Field of Search............ 74/606 A, 606 R; 62/3; 123/196 AB

[56] References Cited
UNITED STATES PATENTS

| | | | |
|---|---|---|---|
| 1,564,742 | 12/1925 | Acker | 74/606 A |
| 1,639,680 | 8/1927 | Acker | 74/606 A |
| 2,063,783 | 12/1936 | Barnes | 123/196 AB |
| 3,054,840 | 9/1962 | Alsing | 62/3 |
| 3,238,944 | 3/1966 | Hirschhorn | 62/3 |
| 3,800,913 | 4/1974 | Schmitt | 74/606 R |

FOREIGN PATENTS OR APPLICATIONS

| | | | |
|---|---|---|---|
| 1,037 | 4/1912 | United Kingdom | 74/606 A |

Primary Examiner—William J. Wye
Attorney, Agent, or Firm—Clelle W. Upchurch

[57] ABSTRACT

A motor vehicle transmission is associated in fluid connection with a reservoir for the fluid, means for circulating the fluid between the transmission and the reservoir and a thermoelectric cooling device in heat conducting association with the reservoir.

6 Claims, 1 Drawing Figure

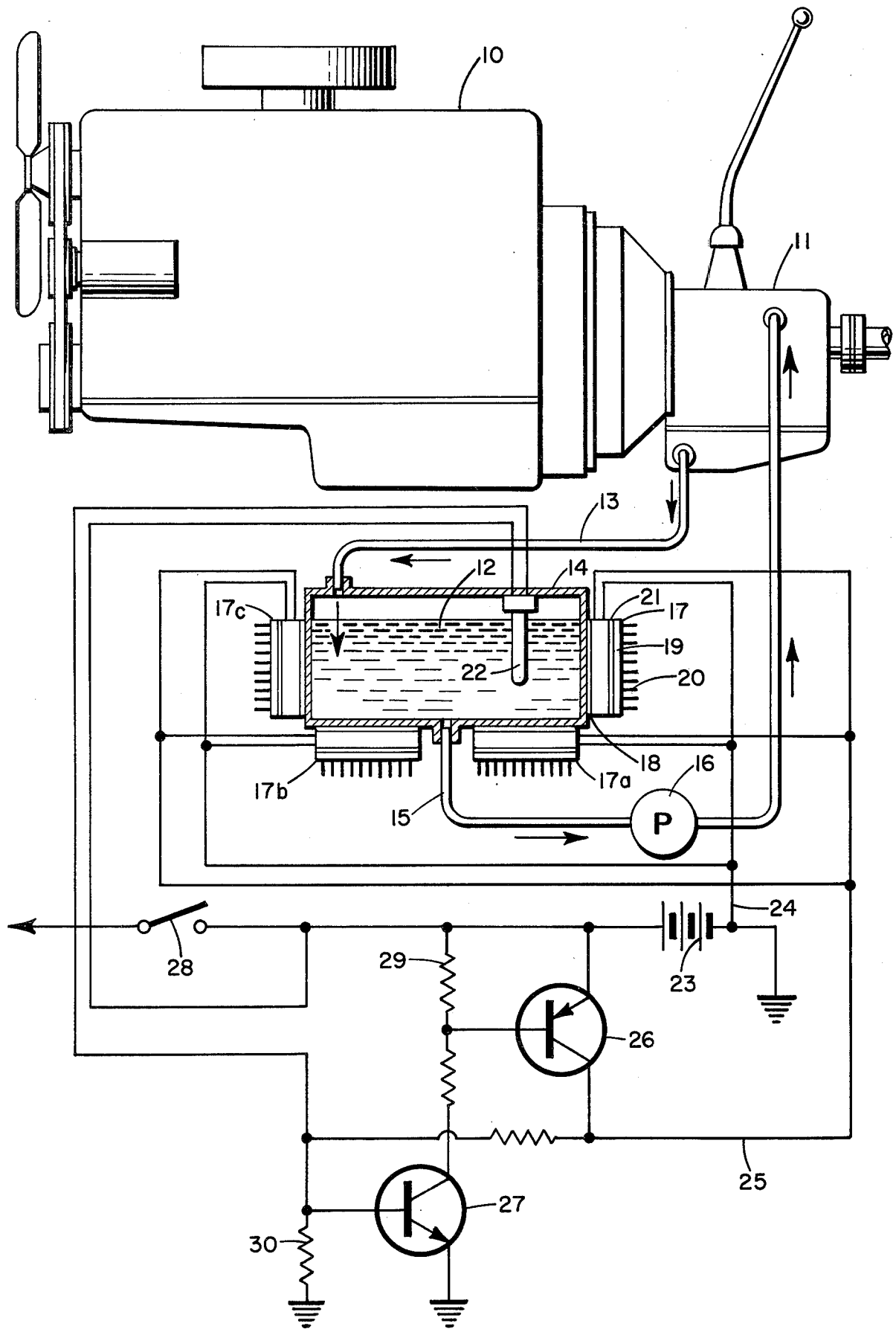

3,874,183

COOLING DEVICE FOR FLUID OF A MOTOR VEHICLE TRANSMISSION

This invention relates generally to transmissions for motor vehicles and more particularly to a means for cooling the fluid used in the transmission.

The components of motor vehicle transmissions or change-gear boxes are submerged in a cooling fluid to avoid excessive temperatures in the gear box and rapid wear of the components. The transmission fluid is usually capable of maintaining the temperature at a safe level by transfer of heat through the metal gear box housing. However, the fluid sometimes becomes too hot to adequately protect the components from wear when the vehicle is pulling a heavy load, particularly on a roadway which is inclined upwardly. This is particularly true of large trucks or tractor-trailer rigs carrying heavy loads up long hills or mountains.

Various devices have been proposed for cooling the fluid used in the transmissions of large trucks but none of them is entirely suitable. In one such device, the fluid is circulated from the transmission through the vehicle's radiator. However, the water in the radiator usually becomes heated too during long hard climbs when cooling of the transmission fluid is needed the most. It has also been proposed to provide fins on the housing of the transmission to improve the dissipation of the heat absorbed by the fluid into the surrounding atmosphere. Heat removal by the fins is inadequate, however, when the truck is under heavy load for an extended period of time.

It is therefore an object of this invention to provide a novel and improved device for removing heat from the cooling fluid of a motor vehicle transmission or change-speed gear box. Another object of the invention is to provide means for removing heat absorbed by the fluid in a change-speed gear box of a motor vehicle which is capable of removing heat as rapidly as it develops while the vehicle is under a heavy load. Still another object of the invention is to provide a device capable of spot cooling and close temperature control of the fluid used in a transmission of a motor vehicle.

Other objects of the invention will become apparent from the following description with reference to the accompanying drawing wherein one embodiment of the invention is illustrated.

The foregoing objects and others are accomplished in accordance with this invention, generally speaking, by providing a system for circulating the cooling fluid of a motor vehicle change-speed gear box or transmission between the gear box and a reservoir equipped with a thermoelectric cooling device for withdrawing heat from the fluid while it is in the reservoir. The gear box may be either a manually or automatically actuated change-speed gear box.

Referring now to the drawing a conventional engine 10 for a motor vehicle is shown in combination with a conventional manual shift gear box 11. The various components of the gear box 11 are cooled by a conventional fluid 12 such as ethylene glycol. Fluid 12 is circulated from gear box 11 through conduit 13 to a reservoir 14 and from reservoir 14 through pipe 15 by pump 16 to gear box 11.

Fluid 12 is cooled in reservoir 14 by Peltier-type thermoelectric heat pumps 17, 17a, 17b and 17c mounted on the walls of reservoir 14. As shown in the drawing, four heat pumps are used in the illustrated embodiment but in some embodiments one or two may be sufficient while in other embodiments more than four may be required. Moreover, the size of the heat pump may be varied to cover more or less of the wall of the reservoir.

Peltier-type thermoelectric heat pumps are commercially available. The Peltier effect is the absorption or generation of heat at the junction of dissimilar metals or semiconductors when a direct current flows through the junction. A Peltier heat pump withdraws heat from a fluid to a heat sink which removes both the pumped heat and the Joule heating which occurs in the device due to its finite electrical resistance.

Heat pumps 17, 17a, 17b and 17c are identical so only one is described in detail. Heat pump 17 is provided with a heat sink 19 having fins 20 to facilitate the conduction of heat from fluid 12 to the surrounding atmosphere. A mica sheet 21 or other heat conductor but electrical insulator coated on both sides with a thermal grease is disposed between heat sink 19 and heat pump 17. A sheet of mica 18 coated with thermal grease or a sheet of some other heat conductor and electrical insulator may be disposed between the heat pump 17 and the wall of reservoir 14. Because strip 21 is a good electrical insulator, chances of grounding of the heat pump 17 through heat sink 19 are reduced.

Heat pumps 17, 17a, 17b and 17c are electrically connected to the vehicle's storage battery 23 through lead wire 24 and, through wire 25, to a conventional semiconductor switch composed of transistors 26 and 27. The semiconductor switch is connected to battery 23 between battery 23 and the vehicle ignition switch 28.

A temperature sensitive resistor 22 is mounted in reservoir 14 and is electrically connected to the semiconductor switch. A biasing resistor 29 biases PNP transistor 26 with the temperature of fluid 12. As the temperature of fluid 12 increases above a preselected safe temperature, the resistance of temperature sensitive resistor 22 decreases and causes current flow through resistor 30. The current flow biases on NPN transistor 27 which draws sufficient current through resistor 29 to turn on transistor 26 and permit current flow through heat pumps 17, 17a, 17b and 17c. Heat is withdrawn from fluid 12 through the wall of reservoir 14 and through heat sink 19 to fins 20. The various components of the circuit are chosen to provide cooling of fluid 12 anytime it rises above a safe temperature. Any other means for automatically actuating the heat pump may be used instead of the one illustrated.

In an alternate embodiment, one or more heat pumps can be connected to battery 23 through a circuit having a manual switch disposed where the driver of the vehicle has access thereto instead of to the automatic control circuit illustrated in the drawing. The driver can manually start the heat pump as he enters a long hard pull and turn it off after it is no longer needed. A thermocouple can be disposed in reservoir 14 to measure the temperature and can be connected to a suitable guage or light on the dash board or other convenient place to alert the driver to turn on the manual switch when the temperature of the fluid rises above a safe temperature.

The wall of the reservoir should of course be a heat conductor such as iron, steel, copper or aluminum. The heat sink and fins are preferably copper, aluminum or other good heat conducting metal.

The embodiment of the invention illustrated in the drawing is shown in combination with a standard or manual transmission because such transmissions are frequently used on tractortrailers and large trucks. The invention, however, is also applicable to automatic transmissions.

Although the invention is described in detail for the purpose of illustration it is to be understood that such detail is solely for that purpose and that variations can be made therein by those skilled in the art without departing from the spirit and scope of the invention except as it may be limited by the claims.

What I claim is:

1. Means for cooling a fluid in a change-speed gear box comprising a reservoir for storage of a supply of said fluid, means for circulating fluid between the gear box and the reservoir, and means for withdrawing heat from the fluid in the reservoir comprising a thermoelectric heat pump.

2. The cooling means of claim 1 wherein said means for withdrawing heat from the fluid comprises a thermoelectric cooling device, a heat sink and a sheet of heat conductive electrical insulation therebetween.

3. The cooling means of claim 1 comprising means responsive to temperature change of the fluid for automatically connecting the heat pump electrically to an electrical power source.

4. The cooling means of claim 1 having means for connecting the heat pump to a power source when the temperature of the fluid rises.

5. A means for cooling a fluid used in a change-speed gear box comprising a reservoir, a conduit leading from the reservoir to a gear box for flow of fluid from the gear box to the reservoir, a conduit for flow of fluid from the reservoir to the gear box, a pump for moving fluid through said conduits, a thermoelectric heat pump disposed against a wall of the reservoir, a heat sink associated with the said heat pump, and means for actuating the heat pump.

6. The device of claim 5 comprising means for sensing the temperature of fluid in the reservoir and a semiconductive switch responsive to the temperature sensing means for turning the heat pump on and off.

* * * * *